United States Patent [19]
Woodbury et al.

[11] Patent Number: 5,442,593
[45] Date of Patent: Aug. 15, 1995

[54] APPARATUS AND METHOD OF NULLING DISCRETE FREQUENCY NOISE SIGNALS

[75] Inventors: Dale T. Woodbury, Belmont; Christopher R. Doerr, Cambridge; Tze T. Chien, Wayland, all of Mass.

[73] Assignee: The Charles Stark Draper Laboratory, Inc., Cambridge, Mass.

[21] Appl. No.: 48,759

[22] Filed: Apr. 16, 1993

[51] Int. Cl.⁶ .............................................. H04B 1/06
[52] U.S. Cl. ..................................... 367/135; 367/901
[58] Field of Search ................. 367/901, 126, 140, 12, 367/135; 381/71, 94; 364/574, 572, 724.19, 724.08; 318/128; 324/233

[56] References Cited

U.S. PATENT DOCUMENTS

| | | | |
|---|---|---|---|
| 4,232,381 | 11/1980 | Rennick et al. | 367/901 |
| 4,368,429 | 1/1983 | Jamison | 324/233 |
| 5,126,641 | 6/1992 | Putman et al. | 318/128 |

Primary Examiner—Daniel T. Pihulic
Attorney, Agent, or Firm—Lappin & Kusmer

[57] ABSTRACT

The present invention relates to a signal processing system for generating a nulling signal for attenuating a periodic noise component from an information signal. According to one aspect of the invention, the system includes two nested feedback networks. One network detects the phase angle and frequency of the noise component, and generates a nulling signal having a phase angle and frequency substantially equal to the phase angle and frequency of the noise component. The other network detects the amplitude of the noise component, and scales the nulling signal to have an amplitude substantially equal to the amplitude of the noise component. According to a further aspect of the invention, the system includes a combining network for attenuating the noise component by combining the information signal with the nulling signal. In this way, the invention preserves the high fidelity of the information signal except over a very narrow bandwidth, adjacent to the noise signal frequency. According to one embodiment the combining network is mechanical in nature, while according to another embodiment, the combining network is electronic in nature.

26 Claims, 8 Drawing Sheets

APPARATUS AND METHOD OF NULLING DISCRETE FREQUENCY NOISE SIGNALS

BACKGROUND OF THE INVENTION

The present invention relates to the field of signal processing and more particularly to tracking and eliminating of a discrete frequency noise signal from an information signal. Many physical systems contain discrete frequency noise components that corrupt the information signal. One example of this is the spin frequency noise and its harmonics which exist in gyroscopes. Other examples include the mechanical dithering of ring laser gyroscopes, discrete frequency acoustic noise, and vibrational noise in mechanical structures.

In the prior art, information signals contaminated with discrete frequency noise are typically sent through a conventional finite width notch filter to attenuate the information signal at the fundamental frequency component of the noise. Along with removing the information and noise at the fundamental frequency of the noise signal, a portion of the band adjacent to the noise frequency is also attenuated.

In prior art systems it is typical to be forced to tradeoff between notch filters with very narrow bandwidths, which retain as much of the information signal as possible and notch filters with broader bandwidths that remove wandering or jittering periodic noise signals but unduly attenuate the information signal and produce phase distortion at adjacent frequencies. Such tradeoffs are undesirable and limit the performance of signal processing systems. Furthermore, since conventional notch filters distort the phase of information signals and degrade fidelity, they are a poor choice for precision control and high resolution processing.

Accordingly, an object of this invention to provide an improved system and apparatus for attenuating a periodic noise component from an information signal.

Another object of the invention is to provide a signal processing system that generates a sinusoidal nulling signal for mechanically or electrically attenuating periodic noise components.

A further object of the invention is to provide a system and method for attenuating a periodic noise component by generating a nulling signal which has a phase, frequency and amplitude that substantially tracks the phase, frequency and amplitude of the noise component, while maintaining the information signal unperturbed except over a very narrow bandwidth.

Other objects of the invention will in part be apparent from the following description.

SUMMARY OF THE INVENTION

This invention relates to a signal processing system and method for attenuating a noise component from an information signal. According to one embodiment, the system includes a phase and frequency nulling network for detecting a phase angle and a frequency associated with the noise component, and for generating a nulling signal having a phase angle and a frequency substantially equal to the phase angle and frequency associated with the noise component. The system can also include an amplitude scaling network for detecting an amplitude associated with the noise component, and for scaling the nulling signal to have an amplitude substantially equal to the amplitude associated with the noise component. The system can further include a combining subsystem for attenuating the noise component by combining the nulling signal with the information signal.

The combining subsystem can be predominantly electronic in nature or predominantly mechanical in nature. According to one embodiment, the combining subsystem includes an electronic summation network which attenuates the noise component by adding the nulling signal to the information signal. According to another embodiment, the combining subsystem can be embodied in a gyroscope having a housing, a rotor, a position detector and an actuator assembly. The position detector provides an information signal representative of the angular position of the rotor measured between an axis of rotation and a first cartesian axis. Due to mechanical vibrational noise, the information signal can include a noise component. The system attenuates the noise component by applying the nulling signal to the actuator assembly, which in response applies a corresponding torque to the rotor to attenuate the mechanical vibrational noise.

In a further embodiment of the invention, the system generates at least first and second noise nulling signals for controlling at least first and second torque actuators to attenuate a periodic vibrational noise in a mechanical apparatus. The vibrational noise can be resolved into a first noise component acting predominantly along a first cartesian axis and a second noise component acting predominantly along a second cartesian axis. The first torque actuator can apply a first mechanical torque to the apparatus along the first cartesian axis, and the second torque actuator can apply a second mechanical torque to the apparatus along the second cartesian axis. Due to mechanical coupling inherent in the apparatus, the torque actuators are related to each other by a first and second cross-coupling coefficients. The first cross-coupling coefficient defines a portion of the first mechanical torque cross-coupled to the apparatus along the second cartesian axis. The second cross-coupling coefficient defines a portion of said second mechanical torque cross-coupled to the apparatus along the first cartesian axis.

The system includes first and second phase and frequency nulling networks and a coupling network. The first phase and frequency nulling network generates a first in-phase signal having a frequency and a phase angle substantially equal to the frequency and the phase angle of the first noise component. That network also generates a first out-of-phase signal having a frequency substantially equal to the frequency associated wit the first noise component and a phase angle differing by a first amount from the phase angle associated with the first noise component. Similarly, the second phase and frequency nulling network generates a second in-phase signal having a frequency and a phase angle substantially equal to the frequency and the phase angle of the second noise component. That network also generates a second out-of-phase signal having a frequency substantially equal to the frequency associated wit the second noise component and a phase angle differing by a second amount from the phase angle associated with the second noise component.

The coupling network includes scaling elements for scaling the first and second in-phase signals by multiplying them by the first and second cross-coupling coefficients, respectively. The coupling network also includes first summation elements for generating the first nulling signal by combining the first; scaled in-phase signal with the second out-of-phase signal. The coupling network further includes second summation elements for generating the second nulling signal by combining the second scaled in-phase signal with the first out-of-phase signal.

Thus, the invention provides an improved system and apparatus for attenuating a periodic noise component from an information signal. As one skilled in the art will appreciate, the invention can accomplish this by generating a nulling signal which has a phase, frequency and amplitude that substantially tracks the phase, frequency and amplitude of the noise component to be attenuated. Further, the invention maintains the information signal unperturbed, except over a very narrow bandwidth.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
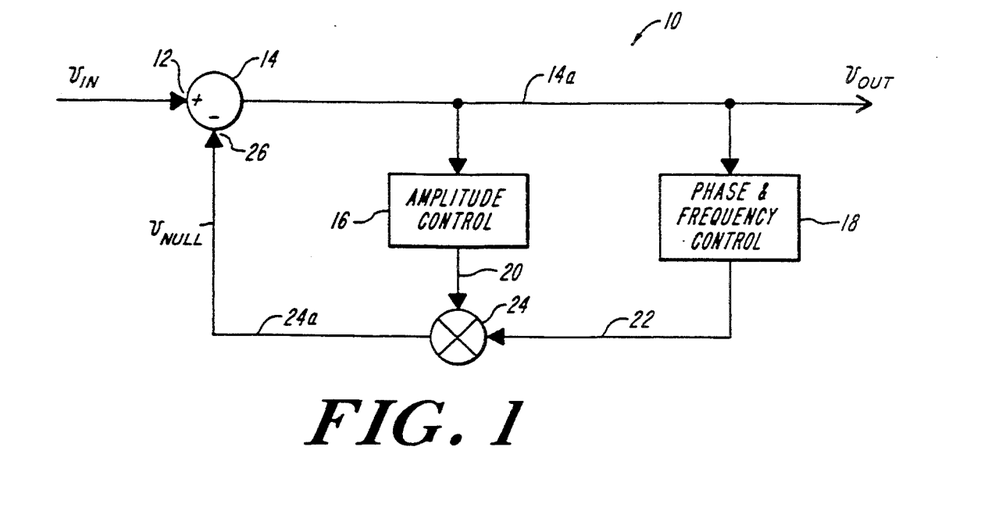
FIG. 1 shows a simplified block diagram of a signal processing system according to the invention.

FIG. 1 shows a functional block diagram of a signal processing system 10, according to the invention, for eliminating a selected discrete frequency signal. The system 10 has a phase and frequency control circuit 18 operating in cascade with an amplitude control circuit 16. An input signal, $V_{in}$, is coupled into the noninverting input 12 of a subtractor element 14. The output of subtractor 14 is applied by way of line 14a ($V_{out}$) to the inputs of the amplitude control circuit 16 and the phase and frequency control circuit 18. Circuits 16 and 18 lock onto and track the amplitude, phase and frequency of the selected periodic discrete frequency component to be eliminated from the input signal $V_{in}$. An amplitude matched signal from circuit 16 and a phase and frequency matched signal from circuit 18 on lines 20 and 22, respectively, are applied to the inputs of an analog multiplier element 24. The resulting nulling signal on line 24a ($V_{null}$) is fed back into the subtractor element 14 via the inverting input 26. The subtractor 14 subtracts the nulling signal $V_{null}$ from the input signal $V_{in}$, thereby eliminating the selected discrete frequency component from $V_{in}$. The output signal $V_{out}$, from subtractor element 14, is not only the ultimate filtered output from system 10, but is also fed back to control circuits 16 and 18 to ensure uninterrupted phase, frequency and amplitude tracking.

According to some embodiments of the invention the subtractor element 12 may be electronic in nature, while in other embodiments the element 12 may be mechanical in nature. This is best understood by way of an example, discussed below in relation to FIGS. 1 and 2.

Figure 2:
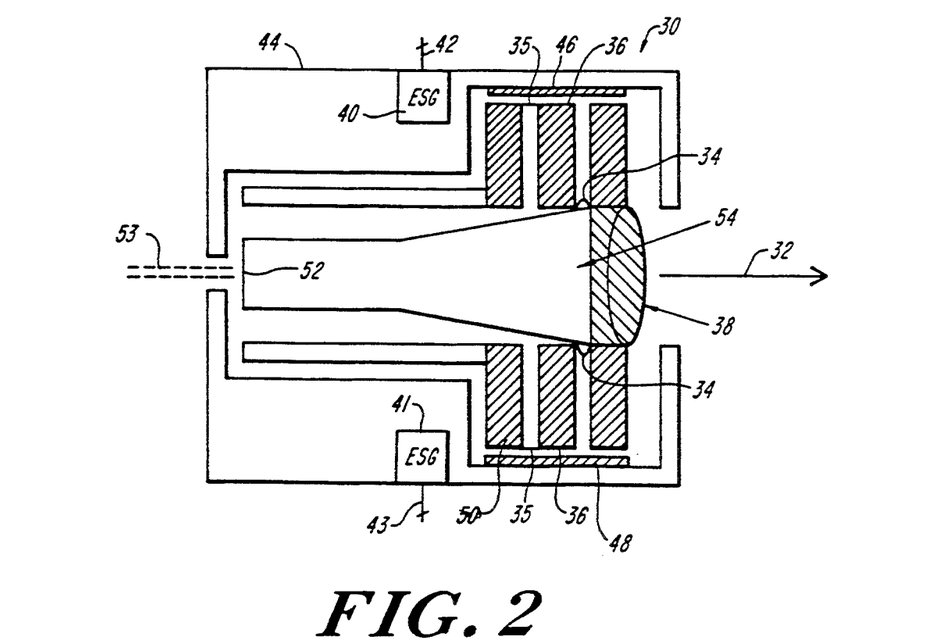
FIG. 2 shows a simplified block diagram of an Optical Reference Gyroscope.

FIG. 2 depicts a simplified block diagram of an Optical Reference Gyroscope (ORG) 30 of the type described in U.S. Pat. No. 4,270,044. An ORG 30 is used in conjunction with applied beam source 53 which directs a collimated beam through a pin-hole 52 and lens 38 on a spinning wheel or stabilized rotor 54. The result is that a very stable light beam 32 is launched from the center of the spinning wheel. Since the spinning rotor 54 prefers to maintain its orientation in inertial space, the ORG 30 yields a light source that is stable and insensitive to motion of the gyroscope case 44.

The ORG 30 is mechanized with a spinning rotor 54, a gimbal ring 36, a motor shaft 50, and two-axis, concentric hinge assembly 34 and 35. The rotor 54 is connected to the gimbal ring 36 by an outer hinge assembly 34, so the rotor 54 may pivot with respect to the gimbal ring 36. Likewise, the gimbal ring 36 is connected to the motor shaft 50 by an inner hinge assembly 35 so it may also pivot, but on an axis perpendicular to the gimbal-rotor pivot axis. This allows the rotor 54 (and thus beam 32) to move independently of the case 44 motion, similar to a universal joint.

ORGs typically include Electrical Signal Generators (ESGs) 40 and 41 for generating signals on lines 42 and 43, respectively, indicative of the angular position of the spinning rotor with respect to the ORG case 44. ORGs also typically include electronically controllable torque generators 46 and 48 for controlling, within certain limits, the angular position of the spinning rotor 54 with respect to the ORG case 44.

A light beam 32 launched from an ORG 30 may be detected by an Optical Signal Generator (OSG). An OSG is a photo-electric device for receiving a light beam, precisely detecting any movement in that beam and generating an electrical signal indicative of the beam movement. The position of the light beam, as electronically determined by the OSG, may then be used for a variety of control applications.

A limitation to the usefulness of an ORG 30 is noise resulting from unavoidable rotor asymmetries in the ORG. This noise manifests itself as a periodic noise component on the ESG outputs on lines 42 and 43 at the frequency of rotation of the rotor. Another limitation of ORG 30 is the noise caused by misalignments between the pinhole 52 where the light from source 53 enters the ORG 30 and the ORG lens 38. This noise manifests itself as beam wobble and is detected by an OSG as a periodic noise component at the frequency of rotation.

By utilizing the embodiment of FIG. 1, wherein element 14 is electronic in nature, and Vin is either of the ESG outputs on lines 42 or 43, the periodic noise component contained in those outputs may be substantially removed. Likewise, the system of FIG. 1 could also be employed to filter out the periodic noise contained in an OSG output. This is discussed below with respect to FIG. 3.

Alternatively, in a second embodiment of FIG. 1 the nulling signal $V_{null}$ may be fed back to the torque generators 46 and 48 of the ORG 30 to dynamically adjust the position of rotor 54, thereby dynamically compensating for the inherent rotor asymmetries. This approach causes the ORG torque generators 46 and 48 to act collectively as a mechanical subtraction element (corresponding to subtractor 14 of the embodiment of FIG. 1). Dynamically compensating for rotor asymmetries substantially removes the periodic noise component contained in the ESG outputs on lines 42 and 43. Embodiments utilizing mechanical subtraction elements are discussed below with respect to FIG. 6.

Figure 3:
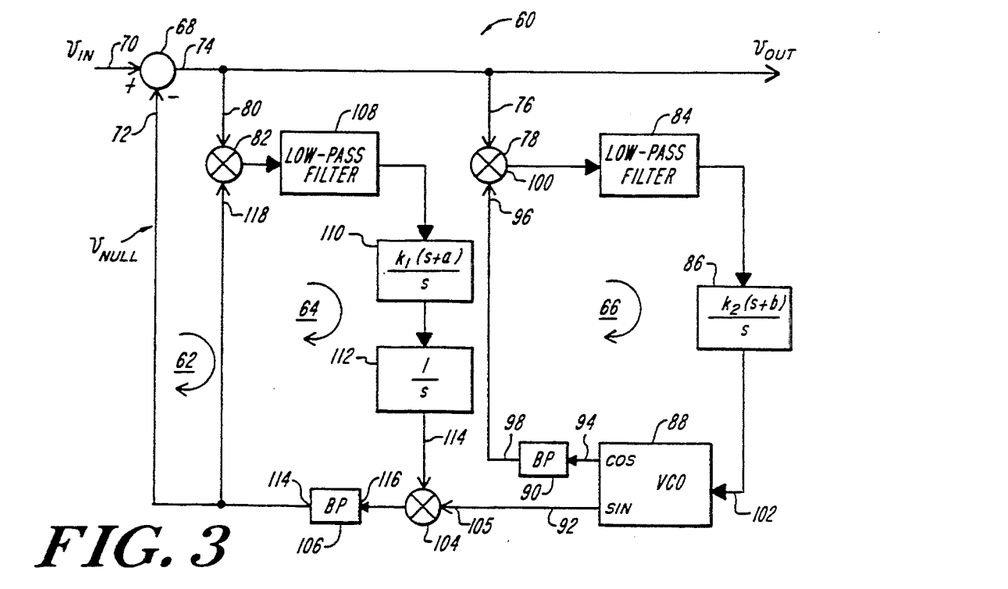
FIG. 3 shows a detailed block diagram of a signal processing system in accordance with the system of FIG. 1.

FIG. 3 shows a more detailed block diagram of a discrete frequency nulling system 60, according to the invention, that utilizes an electronic subtraction element. A further discussion of embodiments utilizing mechanical subtraction elements follows this section.

In the system of FIG. 3, an input signal $V_{in}$ is processed in three nested feedback loops 62, 64 and 66. The control loops 62, 64 and 66 collectively track the phase, frequency and amplitude of a selected discrete frequency component to be eliminated from the input signal $V_{in}$ and generate a corresponding nulling signal $V_{null}$ of the same phase, frequency, and amplitude as that component. $V_{null}$ is subtracted from $V_{in}$ by the subtraction element 68, thereby eliminating, through destructive interference, the selected noise component.

The system 60 may be functionally divided as follows: a signal subtraction loop 62, a phase and frequency control loop 66, and an optional amplitude control loop (ACL) 64. The subtraction element 68, the first element of signal subtraction loop 62, performs a noise signal nulling operation. Element 68 has a noninverting terminal 70, an inverting terminal 72 and an output terminal 74. Element 68 receives a wideband input signal $V_{in}$ at its noninverting terminal 70 and subtracts from that input signal, a generated noise nulling sinusoid $V_{null}$ provided at its inverting terminal 72. Element 68 then presents the resulting filtered output signal $V_{out}$ at its output terminal 74. $V_{out}$, in addition to being the ultimate output of system 60, is also fed to the phase and frequency control loop 66 via the input terminal 76 of a multiplier element 78. $V_{out}$ is also fed back to the ACL 64 via the input terminal 80 of a multiplier element 82.

The subtraction loop 62 connects the input signal $V_{in}$ with the filter 60. The loop 62 also connects the ACL 64 and phase and frequency control loop 66 with the output signal $V_{out}$. Thus, it connects the nulling signal $V_{null}$ to the subtraction element 68 to form a negative feedback loop, responsive to phase, frequency and amplitude differences between. $V_{in}$ and $V_{null}$. The phase and frequency differences between $V_{in}$ and $V_{null}$ are compensated for in the phase and frequency control loop 66, while amplitude differences are compensated for in the ACL 64.

The control loop 66 corresponds to the phase and frequency control element 18 of FIG. 1. In the embodiment of FIG. 3, it is implemented as an electronic phase locked loop (PLL). PLL 66 consists of a phase detection element 78, a low-pass filter element 84, a compensation element 86, a voltage controlled oscillator (VCO) 88, and a band-pass filter element 90. The design and operation of these components are conceptually the same as in a conventional PLL. However, PLL 66 provides an additional nulling signal output at terminal 92 of the VCO 88.

The VCO 88 operates with its capture range centered around the nominal expected frequency of the noise signal to be nulled. The VCO 88 has two outputs 92 and 94 which produce output signals of the same frequency and amplitude but with 90° phase separation. During in-lock operation, output 92 is synchronized to the frequency of the periodic noise signal to be nulled, while output 94 is out of phase by 90°.

Out of phase output 94 is connected to a band-pass filter 90 having a center frequency set to the nominal expected frequency of the discrete noise. Phase detector element 78 is an analog multiplier, or mixer and has two inputs 76 and 96. The first input 76 is connected to output 74 of subtractor 68 and the second input 96 is connected to output 98 of band pass filter 90. The output 100 of multiplier 78 is connected to the low-pass filter element 84.

The low-pass filter element 84, which sets the bandwidth for the PLL 66, eliminates high frequency components contained in the output signal from multiplier 78. However, element 84 is calibrated to allow sufficient bandwidth to track a wandering periodic noise signal. The output of the low-pass filter 84 is connected to the compensation element 86. The compensation element 86 has a transient response that causes the PLL 66 to have a zero steady state error for a constant frequency input. The output of the compensation element 86 is connected to the input terminal 102 of VCO 88. The output 92 of VCO 88, being phase and frequency matched with the noise signal to be nulled, is passed to the ACL 64 by way of the multiplier 104. The ACL 64 then performs amplitude compensation to substantially match the amplitude of the nulling signal with the amplitude of the noise signal.

The ACL 64 includes a multiplier element 104, a band-pass filter 106, a second multiplier element 82, a low-pass filter 108, a compensation element 110, and an integrator element 112. For the nulling operation, the ACL section 64 connects the output 114 of band-pass element 106 to the input 72 of the subtraction element 68.

The multiplier element 104 is connected to the input 116 of the band-pass filter 106. The band-pass filter 106, functioning in a similar manner to band-pass filter 90, has its center frequency set to approximate the frequency of the noise signal to be nulled. The band-pass filter 106 is connected to input 118 of the multiplier element 82. The other input 80 of the multiplier 82 is connected to the output 74 of the subtractor 68. The output of multiplier 82 is connected to the input of low-pass filter 108. The low-pass filter 108 sets the bandwidth of the ACL 64 to provide a cutoff frequency low enough to remove selected substantially random high frequency components from the output of multiplier 82, but high enough to allow sufficient bandwidth for eliminating a wandering periodic noise signal.

The low-pass filter 108 is connected to the compensation element 110. This provides compensation for amplitude wandering of the periodic noise signal. Compensations element 110 is connected to the input of the integrator element 112, which provides for zero amplitude error when the periodic noise signal has a constant amplitude. The integrator element 112 output is connected to the input 114 of multiplier 104.

Figure 4A:
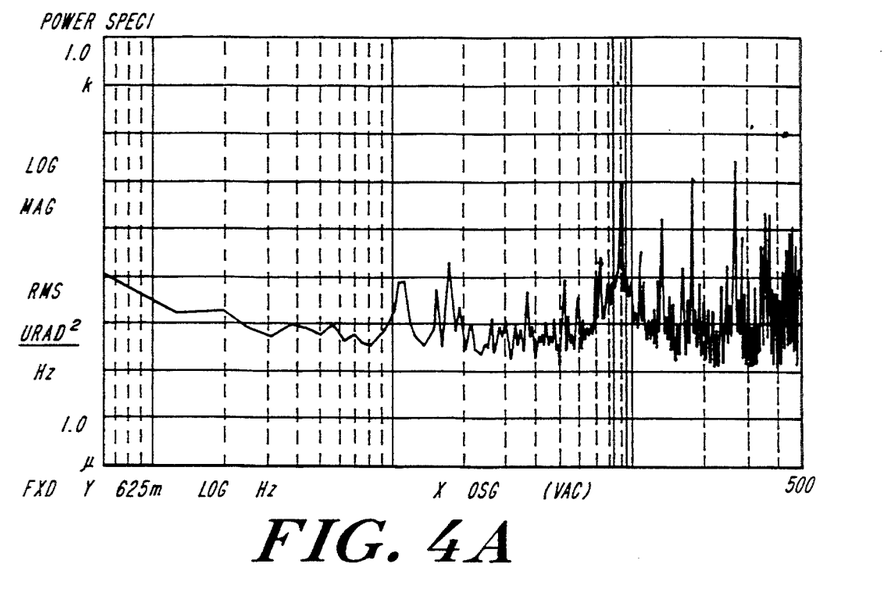
FIGS. 4A and 4B are a graphical representation of the performance of a signal processing system in accordance with the invention.

FIG. 4A illustrates the power spectral density plot of an information signal having a discrete noise component at approximately 90 Hz. Power density, measured in $\mu rad^2/Hz$ is plotted along the y-axis and a logarithmic frequency scale, measured in Hz, is plotted along the x-axis. The narrowness of the discrete power band observed around 90 Hz indicates a substantially sinusoidal noise signal contaminating the information signal at that frequency. A nulling system of the present invention attenuates this noise signal by adding a sinusoid of equal amplitude and opposite phase to the information signal.

Figure 4B:
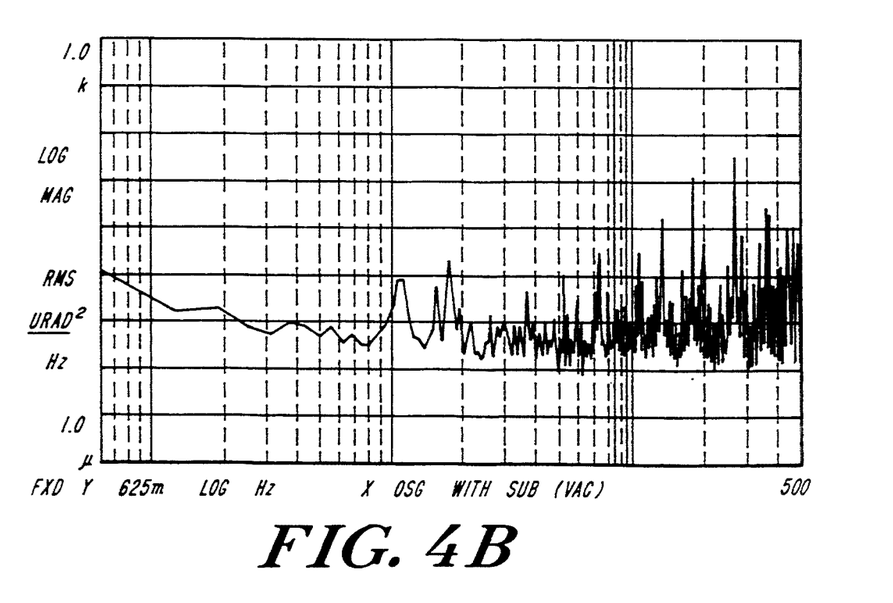

FIG. 4B shows measured values indicating that application of the present invention to the example illustrated in FIG. 4A attenuates the noise signal to the level of the noise floor, without disturbing the information contained in the frequency range around the noise. Specifically, the amplitude of the noise signal in FIG. 4A is reduced by a factor of 155. This corresponds to a reduction factor of approximately 24,000 in power.

ELECTRONIC SUBTRACTION ELEMENT

Figure 5:
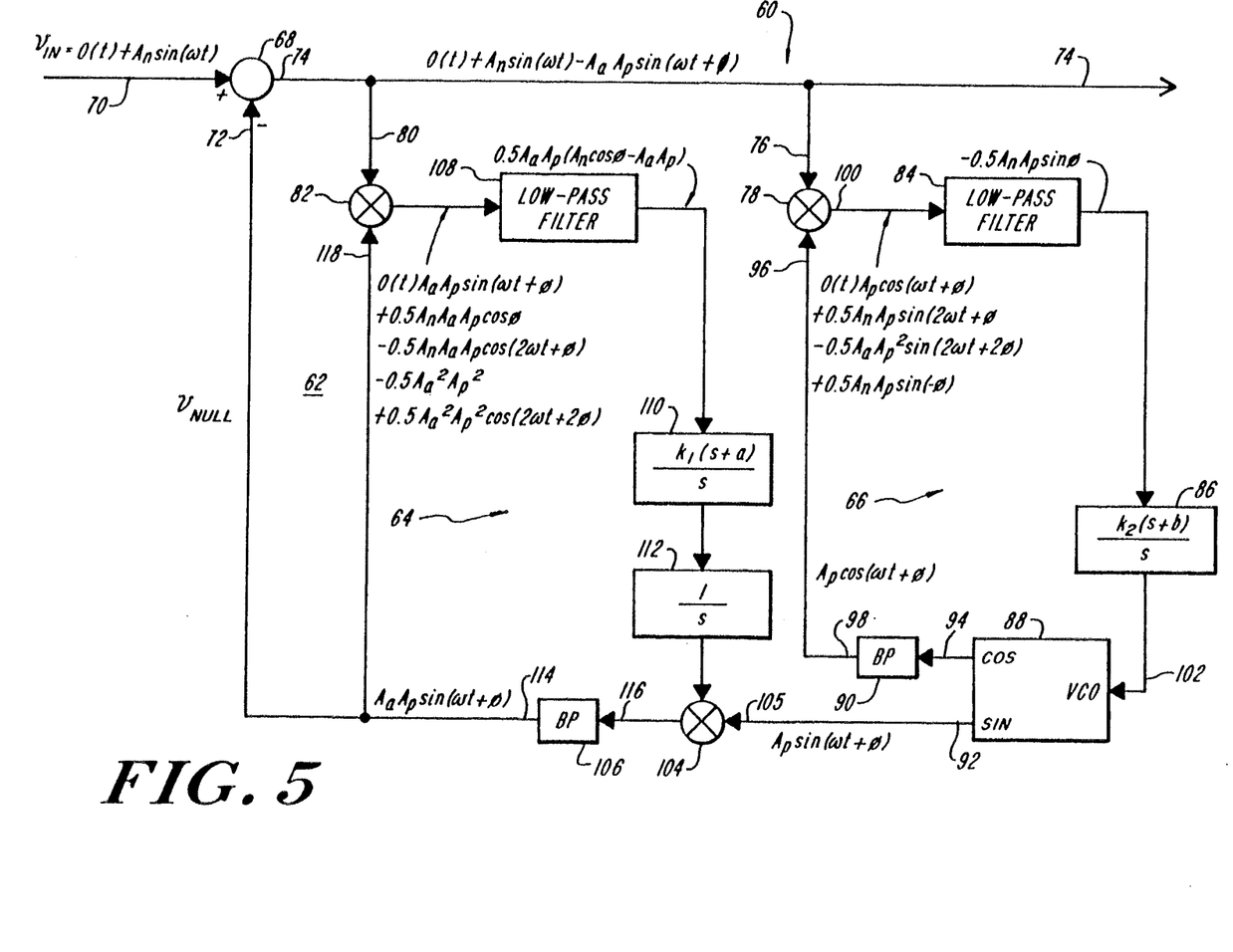
FIG. 5 is a block diagram illustrating resulting waveforms at various points in the system of FIG. 3.

FIG. 5 traces an input signal $V_{in}=O(t)+A_n\sin(\omega t)$ through the embodiment depicted in FIG. 3. The information portion of the input signal $V_{in}$ is represented by $O(t)$, while the noise component is represented by $A_n\sin(\omega t)$. $V_{in}$ is applied to the non-inverting input 70 of the subtraction element 68. The output of the ACL section 64, the nulling signal $A_aA_p\sin(\omega t+\phi)$, is applied to the inverting input 72 of subtraction element 68. The two signals destructively interfere and the output 74 of the subtraction element is the input signal $V_{in}$ with the periodic noise signal $A_n\sin(\omega t)$ attenuated by the correction signal $A_aA_p\sin(\omega t+\phi)$. The two feedback loops PLL 66 and ACL 64 track the differences in amplitude, phase and frequency between the noise signal $A_n\sin(\omega t)$ and the nulling signal $V_{null}=A_aA_p\sin(\omega t+\phi)$ and adjust the nulling signal to substantially remove the periodic noise signal.

Turning now to the process of tracking the phase and frequency of the periodic noise signal, PLL 66 operates to correct the phase difference between the periodic discrete noise signal $A_n\sin(\omega t)$ and the noise nulling signal $V_{null}$. The output signal 74 of the system 60 is fed back to input 76 of the PLL phase detector 78. The phase detector 78 compares the phase of the output signal 74 to the phase of the cosine output 94 of VCO 88 and produces an error signal at its output 100 which is representative of the phase difference between the two signals. This error signal is ultimately fed back to the input 102 of the VCO 88 and operates to change the frequency of the VCO 88 in the direction which causes the phase difference between the two signals to approach 90°. As the phase difference between the filter output 74 and the cosine output 94 approaches 90°, lock occurs and the sine output 92 of the VCO 88 passes a noise nulling signal $A_p\sin(\omega t+\phi)$ to the ACL 64 by way of the input 105 of the multiplier 104. During lock, the nulling signal $A_p\sin(\omega t+\phi)$ tracks the frequency and phase of the discrete periodic noise signal to be nulled $A_n\sin(\omega t)$.

Phase detector 78 of FIG. 5 is an analog multiplier such as the Analog Devices Corp. Type 534 multiplier. The multiplier inputs 76 and 96 receive output 74 of subtractor 68 and the error correction cosine signal 94 of VCO 88, respectively. The product of the two inputs contains a DC component, $0.5A_nA_p\sin(\phi)$, that is dependent of the phase difference between the noise signal $A_n\sin(\omega t)$ and the VCO cosine signal. As in a conventional phase lock loop, this DC component is isolated and nullified to force the loop into lock. In order to isolate this phase dependent component, the product signal is passed through low-pass filter 84. The low-pass filter 84, of a type known in the art, removes the high frequency components of the error signal, and passes only the phase dependent component.

The phase dependent component is transmitted to compensation element 86 which controls the dynamics of the PLL 66. Transient changes in the phase error due to step changes in frequency of the periodic noise are controlled by the compensation, of a type known in the art, which results in substantially zero steady state error for a constant frequency.

The VCO 88 operates as a VCO in a conventional phase-lock loop. The phase dependent voltage, $0.5A_nA_p\sin(\phi)$, offsets the VCO 88 from its free-running frequency so that the phase difference between the VCO cosine output 94 and the periodic noise signal to be nulled approaches 90°.

According to the preferred embodiments, VCO 88 has two outputs, one offset by 90° from the other. Output 94 provides a feedback signal which locks the VCO 88 to the noise signal. Output 92 is in phase with the periodic noise signal and is used to nullify that signal. The illustrated VCO 88 has two outputs, but other methods for generating two identical signals which are phase shifted by 90° from each other would be functionally equivalent. Additionally, in an alternate embodiment the output of VCO 88, $A_p\sin(\omega t+\phi)$, may be directly subtracted from the periodic noise signal, without operation of the optional ACL 64.

VCO 88, as implemented in the preferred embodiment of FIGS. 3 and 5, consists of two PROMs one programmed with the amplitude values of a single period of a sinewave and one programmed with the amplitude values of a single period of a cosine wave. Each PROM has 256 values ranging from 0 to 255. The outputs of the PROMs are converted to analog signals by way of 8-bit digital-to-analog (D/A) converters. The addresses of both PROMs are generated by digital counters and the counters are clocked by a VCO output from a phase lock loop.

The cosine signal generated by the D/A converters is sent through the band-pass filter 90. The band-pass filter 90 is of a type well known in the art, which filters out DC offsets and remote discontinuities from the D/A converters while allowing fine adjustment of the 90° phase difference between the two outputs 92 and 94 of the VCO 88.

The optional ACL 64 adjusts the amplitude of the phase corrected nulling sinusoid $A_p\sin(\omega t+\phi)$ produced at output 92 of VCO 88. The process of amplitude tracking begins by multiplying the phase corrected sinusoid of the PLL 66, $A_p\sin(\omega t+\phi)$, by an amplitude correction factor, $A_a$, in the multiplier 104. The output of the multiplier 104 is the amplitude adjusted and phase corrected nulling sinusoid $A_aA_p\sin(\omega t+\phi)$. The nulling sinusoid is sent through the band-pass filter 106 which removes DC offset and discontinuities in the sinusoid caused by the D/A converters while allowing for fine phase adjustment. The filtered sinusoid is then sent to the inverting input 72 of the subtraction element 68. The filtered sinusoid is also fed back into the ACL 64 via input 118 of the multiplier element 82.

The multiplier element 82 multiplies the filtered nulling sinusoid $V_{null}$ by both the information signal, $O(t)$, and the difference between the periodic noise signal and the nulling sinusoid, $A_n\sin(\omega t) - A_a A_p \sin(\omega t + \phi)$. The output of multiplier 82 is sent through a low pass-filter 108 of the type known in the art, to obtain a signal that is proportional to the difference in amplitude between the nulling sinusoid and the periodic noise signal, $0.5 A_a A_p (A_n \cos\phi - A_a A_p)$.

A compensation element 110, of a type known in the art and constructed similarly to compensation element 86, is used in the preferred embodiment to critically damp the transient response of the ACL 64.

The amplitude difference signal obtained from the low pass filter 108 is integrated in integrator 112 to obtain a DC level indicative of the difference in amplitude between the noise signal and nulling sinusoid. This voltage level is applied via line 114 to multiplier 104, to track the amplitude of the phase corrected sinusoid from the VCO 88.

In the preferred embodiment, the integrator 112 is an active circuit using an op-amp with low offset voltage and low input bias currents. The low offset voltage and input bias currents are necessary to avoid offset in the final amplitude adjustment of the nulling sinusoid. An offset voltage at the input of the multiplier would cause a steady state error in the final amplitude of the nulling sinusoid.

A conventional PLL remains in lock at the point where the error signal applied to the input 102 of the VCO 88 is minimized. However, in the present invention, during lock the sine output 92 is combined with the input signal $O(t) + A_n\sin(\omega t)$ by way of ACL 64 and subtraction element 68, substantially eliminating $A_n\sin(\omega t)$, the noise signal which the PLL 66 locks onto. This causes the system to instantaneously fall out of lock. However, as soon as the circuit begins to fall out of lock, the nulling function becomes imperfect and the noise signal $A_n\sin(\omega t)$ begins to return. As soon as the noise signal begins to return the system re-locks.

In operation, the embodiment of FIG. 5 is calibrated to lock onto relatively low level signals and to have a relatively fast transient response in comparison to the frequency of the noise signal to be nulled. Therefore, the oscillatory falling in and out of lock is substantially transparent, causing the appearance that PLL 66 is actually locking onto a noise signal which is not present. In actuality, the noise signal is being suppressed to the lowest level detectable by the system 60.

MECHANICAL SUBTRACTION ELEMENT

As previously discussed, in an alternate embodiment the subtraction element 68, instead of being electronic in nature, may be implemented by a mechanical system. One such embodiment is now described with respect to eliminating mechanical noise vibrations contained in an Optical Reference Gyroscope (ORG) caused by rotor asymmetries.

Figure 6:
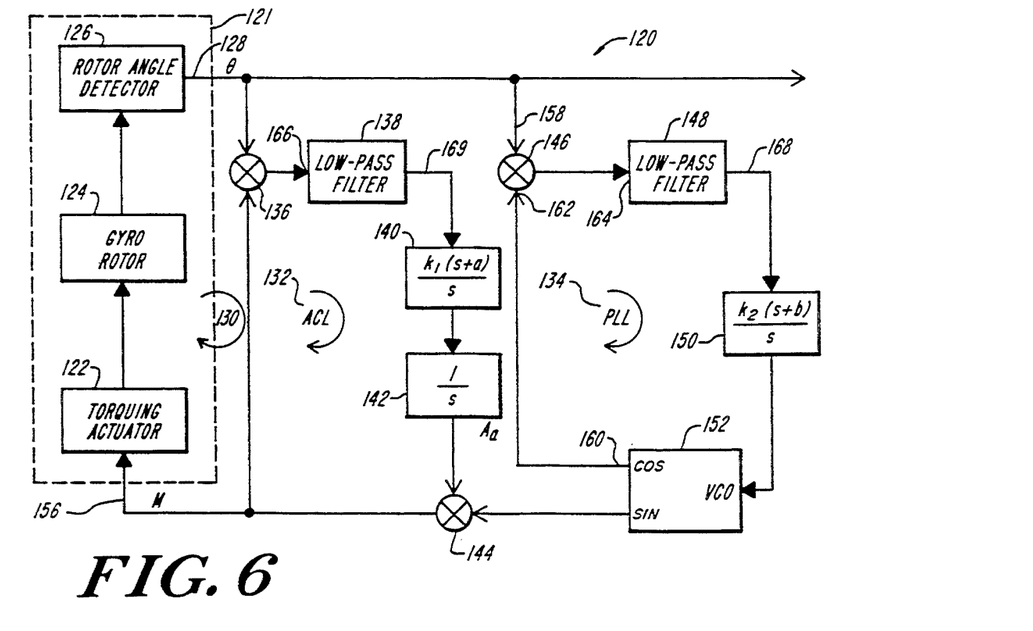
FIG. 6 is an electro-mechanical embodiment of the system of FIG. 3 for attenuating mechanical vibrations.

FIG. 6 depicts a system 120 according to the invention, uniquely adapted to attenuate mechanical vibrational noise caused by rotor asymmetries in an ORG 121. The filter of FIG. 6 compensates for asymmetries along a single axis. However, as discussed below, the approach encompassed by the invention is readily extrapolated to multiple axes.

The system 120 is comprised of three nested feedback loops. There is a subtraction loop 130, an amplitude control loop (ACL) 132 and a phase and frequency control loop 134. The subtraction loop is comprised primarily of elements internal to the ORG 121. They are the torquing actuator 122, the gyroscope rotor 124 and the rotor angle detector 126. The ACL 132 consists of a multiplier element 136, a low pass filter element 138, a compensation element 140, an integrator element 142 and a second multiplier element 144. The phase and frequency control loop is implemented as a phase locked loop (PLL). The PLL 134 includes multiplier element 146, low-pass filter 148, compensation element 150 and voltage controlled oscillator (VCO) 152.

In the system of FIG. 6, the subtraction loop 130 has a torque actuating element 122 connected to the spinning rotor 124 of a gyro. The gyro rotor 124 is in turn coupled to the angle detection element 126. The angle detection element 126 generates an electrical signal $\theta$ at its output 128 which is indicative of the case-to-rotor angle with respect to a particular axis. The output signal $\theta$ is comprised of an information signal $O(t)$ and a vibrational noise component $A_n\sin(\omega t)$.

Similar to the embodiments of FIGS. 3 and 5, the ACL 132 and the PLL 134 collectively generate a nulling signal $M = A_a A_p \sin(\omega t + \phi)$ which is amplitude, phase and frequency matched to the noise component $A_n\sin(\omega t)$. The nulling signal M is fed back to the torque actuator 122. The torque actuator 122, in response to nulling signal M, applies a discrete frequency mechanical vibration to the rotor 124. This mechanical vibration is equal in magnitude but opposite in phase to the vibrational noise giving rise to the noise component $A_n\sin(\omega t)$ at output 128. Consequently, the mechanical vibration generated by the torque actuator destructively interferes with the vibrational noise, thereby substantially eliminating the noise signal $A_n\sin(\omega t)$ from output 128.

In the embodiment of FIG. 6, the torque actuator element 122, the rotor element 124 and the rotor angle detector element 126 collectively fulfill a function similar to that of the subtractor element 68 of FIGS. 3 and 5. Because the rotor 124 may not respond instantaneously to the sinusoidal mechanical vibration applied by the torque actuator 122, there will be a phase lag in the torque-to-angle transfer function $\theta/M$. However, as the following example shows, the system 120 can automatically compensate for such phase lags. Therefore, a feature of the invention is that the performance of the system 120 is relatively unaffected by such phase lag.

In this example, the output 128 of the detector 126 is $$\theta = O(t) + A_n\sin(\omega t)$$

where $O(t)$ is the information portion of the signal and $A_n\sin(\omega t)$ is the discrete frequency noise due to rotor asymmetries. Further, the ORG 121 has an input 156 to output 128 transfer function of $$\theta(j\omega)/M(j\omega) = Ge^{-j\phi_T}.$$

This indicates that the ORG 121 has a gain G and a phase lag of $\phi_T$ at a frequency $\omega$. Thus, if the signal M fed to the torque actuator 122 is $A_a A_p \sin(\omega t + \phi)$ the output 128 of angle detector 126 is $$O(t) + A_n\sin(\omega t) - A_a A_p G\sin(\omega t + \phi - \phi_T).$$

This signal is applied to the PLL 134 by way of input 158 of multiplier 146. The output 160 of VCO 152, $A_p\cos(\omega t + \phi)$, is also fed into the multiplier 146 via input 162. Consequently, the input 164 to the PLL 134 low-pass filter 148 is $$[O(t)+A_n\sin(\omega t)-A_aA_pG\sin(\omega t+\phi-\phi_T)]A_p\cos(\omega t+\phi).$$

At the output 168 of the low-pass filter 148, this signal can be approximated by taking only its DC component:

$$0.5A_p[-A_n\sin(\phi)+A_aA_pG\sin(\phi_T)].$$

Turning to the ACL 132, the input 166 to the low-pass filter 138 is $$[O(t)+A_n\sin(\omega t)-A_aA_pG\sin(\omega t+\phi-\phi_T)]A_aA_p\sin(\omega t+\phi).$$

At the output 169 of the low-pass filter 138, this signal can also be approximated by taking only its DC component:

$$0.5A_aA_p[A_n\cos(\phi)-A_aA_pG\cos(\phi_T)].$$

Since both the ACL 132 and the PLL 134 act to drive the outputs of low-pass filters 138 and 148 to zero, outputs 169 and 168 may be set to zero and solved simultaneously. This results in $$\phi=\phi_T \text{ and}$$

$$A_a=A_n/(A_pG).$$

Consequently the signal $\theta$ at angle detector output 128 becomes $$\theta=O(t)+A_n\sin(\omega t)-[A_n/(A_pG)]A_pG\sin(\omega t+\phi_T-\phi_T).$$

This reduces to $$\theta=O(t)$$

which is the desired result. Thus, the filtering of the system shown in FIG. 6 can compensate for gain and phase lag in the torque-to-angle transfer function $\theta/M$.

Phase lag may also be introduced into the system by way of the measurement of the output 128 of angle detector 126. This might occur if the output 128 was pre-filtered before being received by the ACL 132 and the PLL 134. As the following example shows, the performance of system 120 of FIG. 6 is also substantially unaffected by this type of phase lag.

In this example, the phase lag in the measurement at the frequency $\omega$ is $-\phi_m$. Thus, the output 128 of detector 126 is $$\theta=O(t)+A_n\sin(\omega t-\phi_m)-A_aA_p\sin(\omega t+\phi-\phi_m),$$

where O(t) is the desired signal (already pre-filtered), $A_n\sin(\omega t)$ is the discrete-frequency noise due to the mechanical asymmetries of the rotor 124 and $A_aA_p\sin(\omega t+\phi)$ is the signal M on line 56.

The input 164 to the PLL 134 low-pass filter 148 is therefore, $$[O(t)+A_n\sin(\omega t-\phi_m)-A_aA_p\sin(\omega t+\phi-\phi_T)]A_p\cos(\omega t+\phi).$$

Simplifying this expression and taking only the DC component yields $$0.5A_p[-A_n\sin(\phi+\phi_m)+A_aA_p\sin(\phi_m)]$$

at the output 168 of the low-pass filter 148.

The input 166 to the ACL 132 low-pass filter 138 is $$[O(t)+A_n\sin(\omega t-\phi_m)-A_aA_p\sin(\omega t+\phi-\phi_m)]A_pA_p\sin(\omega t+\phi).$$

Simplifying this expression and taking only the DC component yields $$0.5A_aA_p[A_n\cos(\phi+\phi_\mu)-A_aA_p\cos(\phi_m)]$$

Once again the expressions at the output of low-pass filters 138 and 148 may be set to zero and solved simultaneously. If $\phi_m$ is small this yields $$\phi=0 \text{ and}$$

$$A_a=A_n/A_p.$$

This results in the output 128 being $$\theta=O(t)+A_n\sin(\omega t-\phi_m)-(A_n/A_p)A_p\sin(\omega t-\phi_m).$$

Simplifying this expression yields $$\theta=O(t)$$

which is once again the desired result. Therefore, for small values of $\phi_m$ (e.g. $\phi_m<90°$), the system of FIG. 6 is relatively unaffected by phase lag in the measurement of output 128 from angle detector 126. The system shown is applied to the case with phase lags less than 90°. For a phase lag between 90° and 180°, the signals 92 and 94 in FIG. 3 (also see FIG. 5) should be switched by exchanging the sine and cosine outputs so that the sine output 92 is coupled to the bandpass filter 90 and the cosine output 94 is coupled to the multiplier element 104.

As can be seen from the preceding discussion, if there is no phase lag through the ORG 121 or in the measurement of output 128, the system of FIG. 6 operates substantially like the system of FIGS. 3 and 5. If there are phase lags, the analysis is somewhat more complex. However, the invention, nevertheless compensates for the phase lags and operates relatively uninhibited.

TWO AXIS SYSTEM

Figure 7:
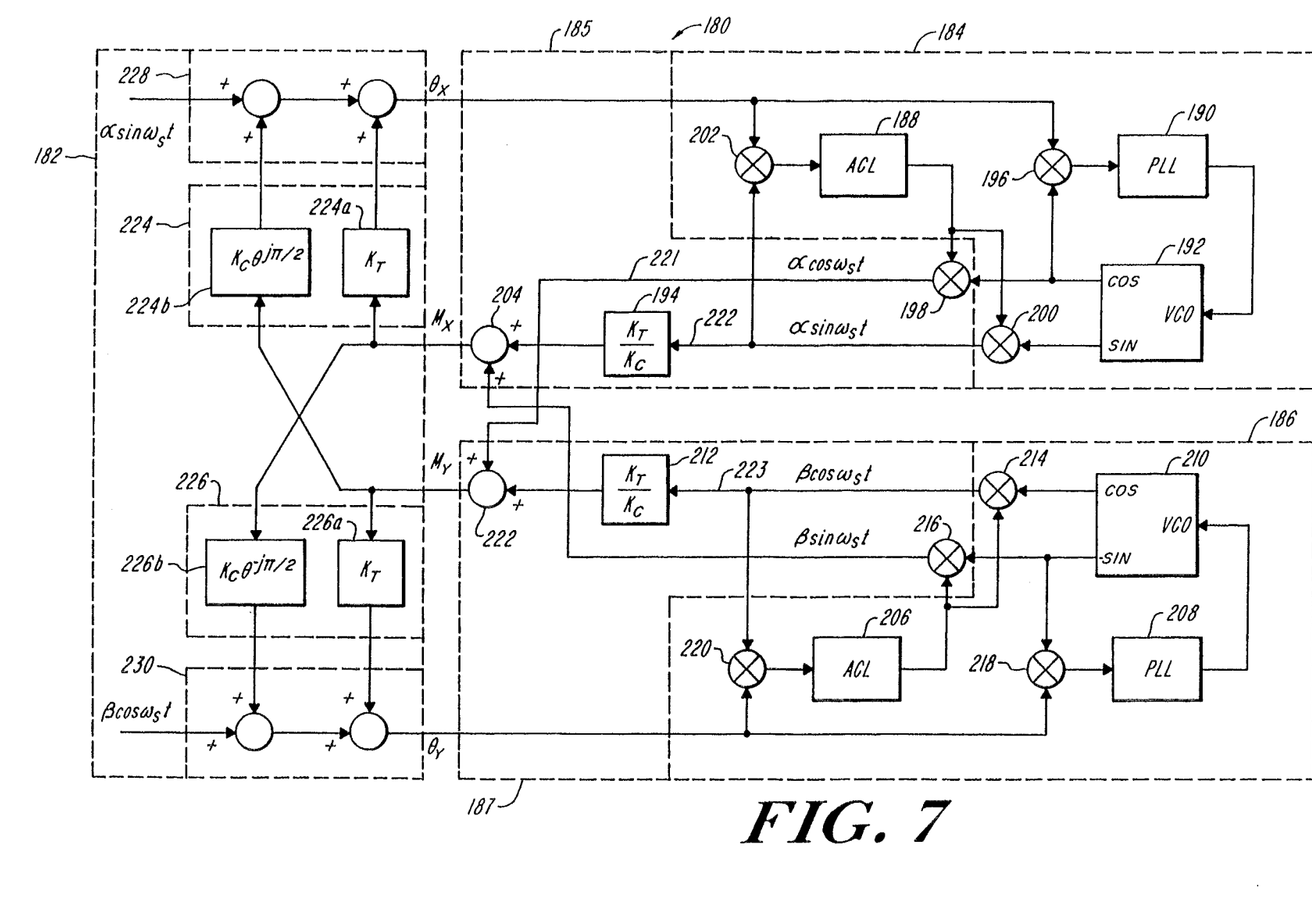
FIG. 7 is an expanded block diagram showing the system of FIG. 6 wherein two such signal processing systems according to the invention are employed, to attenuate mechanical vibrations in two axes.

FIG. 7 shows an alternate embodiment of the system of FIG. 6 wherein the system 180 attenuates mechanical vibrations with respect to two axes. The following embodiment is illustrated with respect to removing discrete frequency noise from a two degree of freedom mechanical gyroscope. This figure contains the model of an ORG, including cross axis coupling.

The dual-axis torquing configuration 180 of FIG. 7 includes two systems 184 and 186. The system 184 attenuates vibrational noise along the x-axis. It has $\theta_x$, a signal indicative of the case-to-rotor angle with respect to the x-axis, as its input. System 184 includes the ACL 188, the PLL 190, the VCO 192, and multipliers 198, 200 and 202 as well as the subtraction element 204 for cross axis correction.

Similarly, the system 186 removes vibrational noise along the y-axis. It has $\theta_y$, a signal indicative of the case-to-rotor angle with respect to the y-axis, as its input. The system 186 is comprised of the ACL 206, the PLL 208, the VCO 210, and multipliers 214, 218 and 220 as well as subtractor 222 for cross axis correction.

Comparing the system of FIGS. 6 and 7, each of the ACLs 188 and 206 of FIG. 7 corresponds to the combination of the low-pass filter element 138, the compensation element 140, and the integrator 142 in FIG. 6. The multiplier elements 198, 200, and 202 of network 184, along with the multiplier elements 218, 214 and 220 of network 186, correspond to the multiplier elements 146, 144, and 136, respectively. Additionally, the PLLs 190 and 208 of FIG. 7 correspond to the combination of the low-pass filter element 148 and the compensation element 150 of FIG. 6. Also, the VCOs 192 and 208 correspond to the VCO 152.

During testing of one form of the invention, it was found that simply connecting the system 184 to the x-axis torque actuator and the system 186 to the y-axis torque actuator did not result in eliminating unwanted vibrational noise signals from both axes. The reason for this is that cross-coupling between the rotor axes occurs. To solve this problem, the embodiment of FIG. 7 includes networks 185 and 187 to cross-couple signals from networks 184 and 186 to generate the control signals $M_x$ and $M_y$. $M_x$ and $M_y$ are in turn applied to the x- and y-axis converters. Due to the cross-coupling networks 185 and 187, each filter 184 and 186 appears to affect only its intended axis.

The cross-coupling network 185 includes the scaling element 194, the multiplier element 198 and the summation element 204. Similarly, the cross-coupling network 187 includes the scaling element 212, the multiplier element 216, and the summation element 222.

Each system 184 and 186 generates two signals, a sinusoid in phase with the noise signal locked onto by the PLL and a sinusoid, 90° out of phase. These sinusoids are generated by the two VCOs 192 and 210. As in the case of the embodiments of FIGS. 3, 5, and 6 the PLLs 190 and 208 cause the generated sinusoids to be phase and frequency matched to the noise signal to be eliminated. Also like those previous embodiments, the ACLs 188 and 206 attend to the amplitude matching functions.

In the system 184, multiplier element 202 provides the signal $\theta_x$ to ACL 188 while multiplier element 196 provides $\theta_x$ to the PLL 190. The multiplier element 200 combines the amplitude scaling factor from the ACL 188 with the phase and frequency matched signal from the VCO 192. In the system 186 the multiplier element 220 carries the signal $\theta_y$ to the ACL 206, while multiplier 218 provides $\theta_y$ to the PLL 208. The multiplier element 214 combines the amplitude scaling factor from the ACL 206 with the phase and frequency matched signal from the VCO 210.

To describe the operation of the system 180, the ORG 182 can be modeled as a torque actuator 224 acting along the x-axis, a torque actuator 226 acting along the y-axis, an x-axis rotor-to-case angle detection element 228, a y-axis rotor-to-case angle detection element 230 and vibrational noise sources $A\sin\omega_s t$ and $B\sin\omega_s t$, where $\omega_s$ denotes the rotor spin frequency. The x-axis torque actuator 224 is further modeled as having a direct-coupling element 224a, representing the actuator's effect on the x-axis and a cross-coupling element 224b, representing its effect on the y-axis. Likewise, the y-axis torque actuator is also comprised of a direct-coupling element 226a and a cross-coupling element 226b.

The direct- and cross-coupling elements, inherent in the ORG 182, result in the following transfer functions (neglecting small phase lags):

$$\theta_x/M_x(j\omega_s) = K_C e^{+j\pi/2}$$

$$\theta_x/M_y(j\omega_s) = K_T$$

$$\theta_y/M_x(j\omega_s) = K_C e^{-j\pi/2}$$

$$\theta_y/M_y(j\omega_s) = K_T$$

With the dual-axis configuration, $A\sin\omega_s t$ and $B\cos\omega_s t$ represent the unwanted spin-frequency noise components contaminating the ORG 182 rotor angle detection outputs $\theta_x$ and $\theta_y$, respectively. The spin-frequency noises in the x- and y-axes are 90° apart. This is not a required condition, but provides an exemplary configuration.

The PLLs 190 and 208 are locked onto the spin-frequency noise. Thus, the system 184 which measures $\theta_x$ outputs $\alpha\cos\omega_s t$ and $\alpha\sin\omega_s t$, and the other system 186 outputs $\beta\cos\omega_s t$ and $-\beta\sin\omega_s t$, where $\alpha$ and $\beta$ are the amplitudes of the sinewaves as determined by the ACL's. Note that the multiplier 198 cross-coupling of network 185 applies the amplitude scaling coefficient $\alpha$ to the $\alpha\cos\omega_s t$ signal, and the multiplier 216 of the cross-coupling network 187 applies the amplitude scaling coefficient $\beta$ to the $\beta\cos\omega_s t$ signal.

Elements 204 and 222 combine two of the sinusoids, $\alpha\sin\omega_s t$ and $\beta\cos\omega_s t$, respectively, by the ratio of the magnitude of the direct-axis $K_T$ and cross-axis $K_C$ transfer functions 194 and 212 at the spin-frequency $\omega_s$. Thus yielding, $$M_y = \alpha\cos\omega_s t + \beta K_T/K_C \cos\omega_s t,$$

and $$M_x = \beta\sin\omega_s t + \alpha K_T/K_C \sin\omega_s t.$$

Using the $\theta/M$ transfer functions at the spin frequency shown earlier as well as the expressions for $M_x$ and $M_y$ just obtained, $$\theta_x = A\sin\omega_s t - \alpha K_C \sin\omega_s t - \beta K_T \sin\omega_s t + \alpha K_T^2/K_C \sin\omega_s t + \beta K_T \sin\omega_s t,$$

and $$\theta_y = B\cos\omega_s t - \beta K_C \cos\omega_s t - \alpha K_T \cos\omega_s t + \beta K_T^2/K_C \cos\omega_s t + \alpha K_T \cos\omega_s t,$$

These can be rewritten as $$\theta_x = (A - \alpha K_C + \alpha K_T^2/K_C)\cos\omega_s t,$$

and $$\theta_y = (B - \beta K_C + \beta K_T^2/K_C)\sin\omega_s t.$$

Thus, each filter affects only the axis it is measuring. The ACLs 188 and 206 drive the spin-frequency component of $\theta$ toward zero. This means $$A - \alpha K_C + \alpha K_T^2/K_C = 0,$$

and $$B - \beta K_C + \beta K_T^2/K_C = 0.$$

As a result, $\alpha$ and $\beta$ are driven towards the following:

$$\alpha = AK_C/(K_C^2 - K_T^2)$$

and $$\beta = BK_C/(K_C^2 - K_T^2).$$

For an ORG with gas at 6 μm of Hg (a near vacuum) inside, $$K_T \approx 2.8 \ \mu\text{rad}/V,$$

and $$K_C \approx 4.9 \ \mu\text{rad}/V$$

Therefore, $$\alpha \approx (0.3 \ V/\mu\text{rad})A,$$

and $$\beta \approx (0.3 \ V/\mu\text{rad})B.$$

As can be seen from the above, by combining the noise nulling signals in accordance with the invention, the networks 185 and 187 compensate for the ORG's internal cross-coupling. Additionally, once the internal dynamics of the ORG have been taken into account, each system 184 and 186 appears to act only upon a single axis. Like the embodiments of FIGS. 3, 5 and 6, the embodiment of FIG. 7 also is capable of automatically compensating for phase lags.

Figure 8A:
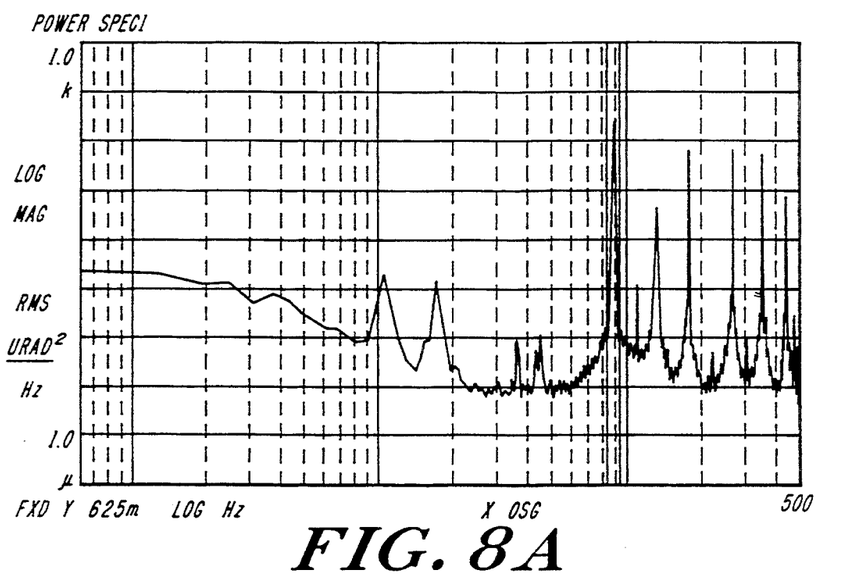
FIGS. 8A and 8B illustrate the power spectral density plot of information signals originating from x- and y-axis ESG outputs, respectively, of systems of the type shown in FIG. 3.
Figure 8B:
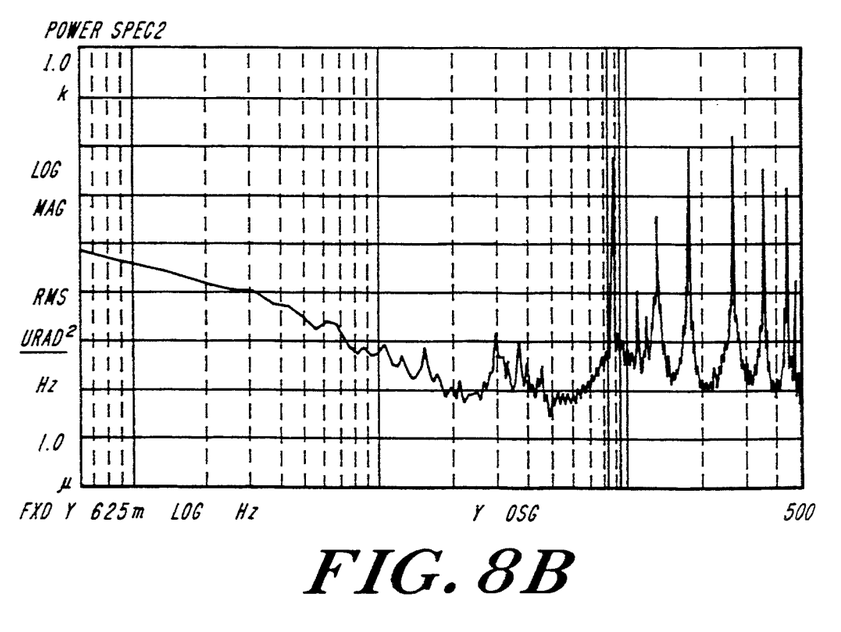

FIG. 8A and 8B illustrate the power spectral density plot of information signals originating from x- and y-axis ESG outputs, respectively, of an ORG of the type depicted in FIG. 3. As can be seen, these outputs have a discrete noise component at approximately 90 Hz. Power density, measured in $\mu\text{rad}^2/\text{Hz}$ is plotted along the vertical axis versus a logarithmic frequency scale, measured in Hz, is plotted along the horizontal axis. The narrowness of the discrete power band observed around 90 Hz indicates a sinusoidal noise signal contaminating the information signals at that frequency. A nulling system of the present invention attenuates this noise signal by adding a sinusoid of equal amplitude and opposite phase to the information signal.

Figure 9A:
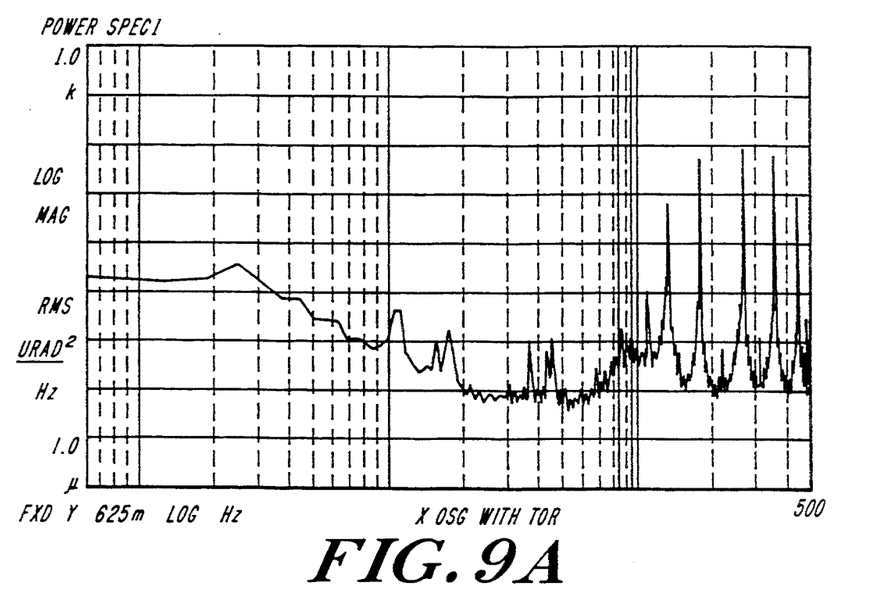
FIGS. 9A and 9B are a graphical representation of the performance of a dual axis signal processing system in accordance with the invention, operating to attenuate noise from the signals shown in FIGS. 8A and 8B.
Figure 9B:
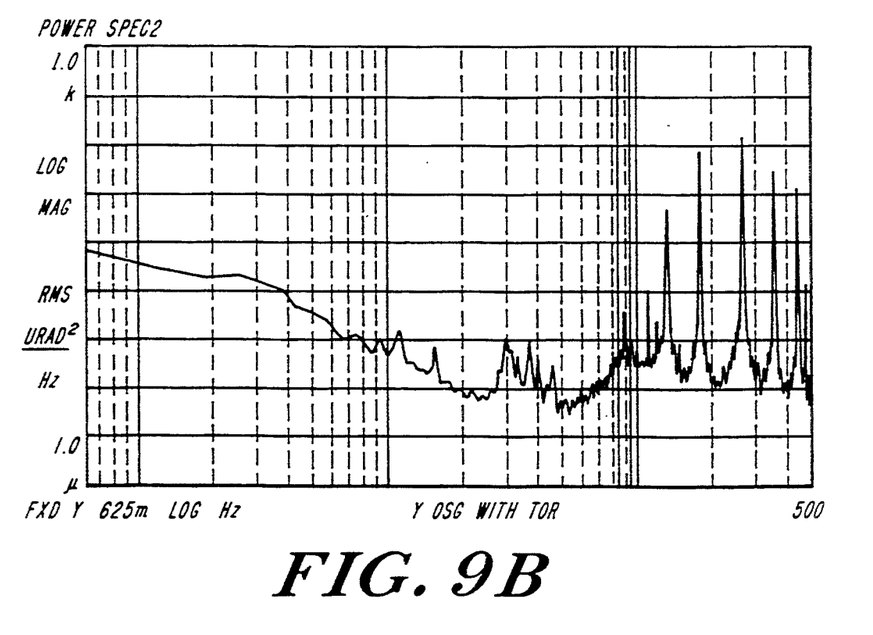

FIGS. 9A and 9B show that application of the present invention to the example illustrated in FIGS. 8A and 8B attenuates the noise signal to the level of the noise floor, without disturbing the information contained in the frequency range around the noise. Specifically, the amplitude of the noise signal in FIG. 8A and 8B is reduced by a factor of 155. This corresponds to a reduction factor of approximately 24,000 in power.

Figure 10A:
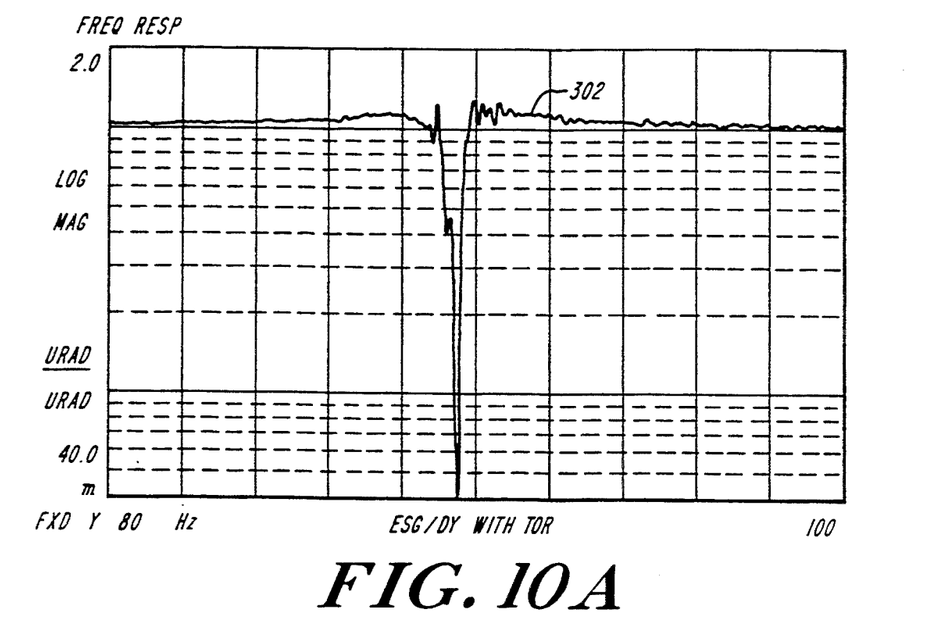
FIG. 10A shows the amplitude transfer function of a dual-axis system of the type depicted in FIG. 7.
Figure 10B:
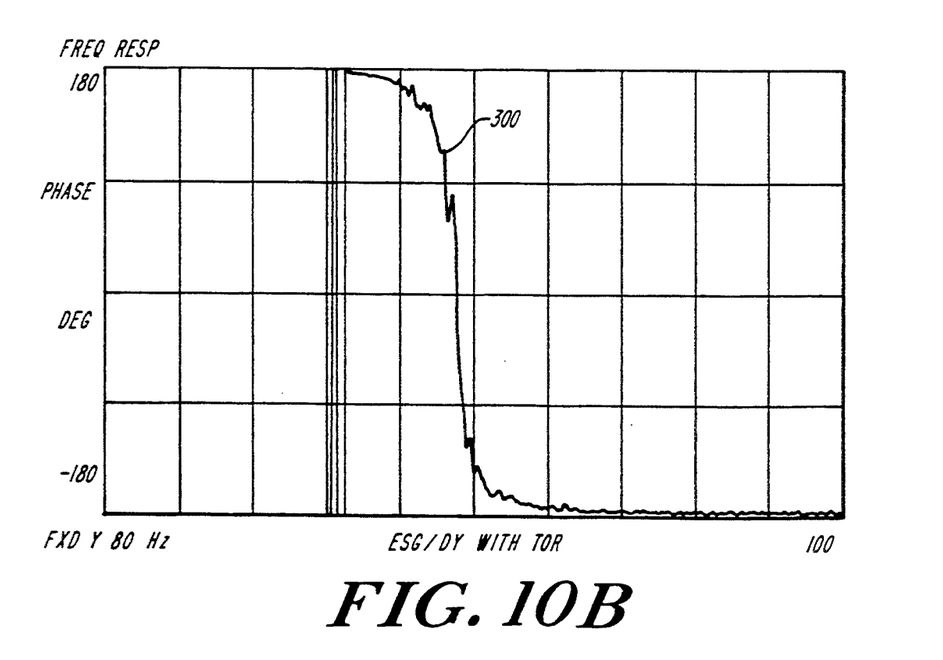
FIG. 10B shows the phase transfer function of a dual-axis system of the type depicted in FIG. 7.

FIGS. 10A (amplitude) and FIG. 10B (phase) depict the transfer function of a dual-axis system of the type depicted in FIG. 7. As can be seen from the phase plot (FIG. 10B), the phase shift in the information signal at frequencies adjacent to the noise signal frequency being eliminated is insignificant.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. A signal processing system responsive to an input signal including an information portion and a periodic noise component, for generating a nulling signal for attenuating the periodic noise component, wherein said noise component has an associated phase angle, frequency and amplitude, said system comprising:
   A. a combining network including means for generating an output signal representative of a combination of said input signal and said nulling signal, and
   B. a phase and frequency nulling network responsive to said output signal including means for detecting said frequency and said phase angle associated with said periodic noise component, and means for generating said nulling signal whereby said nulling signal has a frequency and a phase angle substantially equal to said frequency and said phase angle associated with said noise component.

2. A system according to claim 1 wherein said phase and frequency nulling network further comprises a phase lock network including means for automatically adjusting said nulling signal to compensate for variations in said phase and in said frequency of said noise component.

3. A system according to claim 2 wherein said phase lock network further comprises a variable oscillator network having an oscillator input terminal, a first oscillator output terminal, and a second oscillator output terminal, said variable oscillator network including:
   A. means for generating a locked signal at said first oscillator output terminal, wherein said locked signal has a frequency differing from a selected mean frequency by an amount representative the magnitude of a signal coupled to said oscillator input terminal, and said locked signal has a phase angle differing from said phase angle associated with said noise component by a set amount; and
   B. means for generating said nulling signal at said second oscillator output terminal.

4. A system according to claim 3 wherein said phase lock network further comprises:
   A. a frequency mixer network, having a first input terminal coupled to said combination of said input signal and said nulling signal, a second input terminal coupled to said first oscillator output terminal, and having a mixer output terminal, and including means for generating a frequency error signal at said mixer output terminal, wherein said frequency error signal is representative of a difference in frequency between said nulling signal and said noise component; and
   B. a first low-pass filter, having a first filter input terminal coupled to said mixer output terminal and having a first filter output terminal coupled to said oscillator input terminal, and including means for generating a filtered error signal at said first filter output terminal, wherein said filtered error signal is representative of a substantially dc component of said frequency error signal.

5. A system according to claim 4 wherein said phase lock network further comprises, a first compensation network, coupled between said first low-pass filter and said variable oscillator network, and including means for damping said phase lock network to provide a substantially zero steady state error when said dc component is constant.

6. A system according to claim 5 wherein said phase lock network further comprises, a first band-pass filter network, coupled between said first oscillator output terminal and said second input of said mixer network, and including means for selecting a range of frequencies associated with said noise component for which said phase lock network is operable.

7. A system according to claim 3 wherein said set amount is ninety degrees.

8. A system according to claim 1 wherein said system further comprises amplitude scaling means for scaling said nulling signal to have an amplitude substantially equal to said amplitude of said noise component.

9. A system according to claim 1 wherein said amplitude scaling means further comprises an amplitude scaling network, having a first scaling input terminal, a second scaling input terminal and a scaling output terminal, wherein said second oscillator output terminal couples to said first scaling input terminal, said second scaling input terminal couples to said combination of said input signal and said nulling signal, and said amplitude scaling network including means for generating a scaled nulling signal at said scaling output terminal, wherein said scaled nulling signal has an amplitude substantially equal to said amplitude associated with said noise component.

10. A system according to claim 9 wherein said amplitude scaling network further comprises:
  A. a first multiplier network, having a first multiplier input terminal coupled to said combination of said input signal and said nulling signal, a second multiplier input terminal coupled to said scaled nulling signal, and having a multiplier output terminal, wherein said multiplier network includes means for generating an amplitude error signal, at said multiplier output terminal, representative of a difference in amplitude between said scaled nulling signal and said noise component; and
  B. a second multiplier network, having a third multiplier input terminal coupled to said first multiplier output terminal, a fourth multiplier input terminal coupled to said second oscillator output terminal, and a second multiplier output terminal coupled to said second multiplier input terminal, wherein said second multiplier network includes means for generating, at said second multiplier output terminal, said scaled nulling signal, wherein said scaled nulling signal is representative of a multiplication between said nulling signal and said amplitude error signal.

11. A system according to claim 10 wherein said amplitude scaling network further comprises a second low-pass filter, coupled between said first multiplier output terminal and said third multiplier input terminal, wherein said second low-pass filter includes means for generating, at said third multiplier input terminal, a signal representative of a said amplitude error signal with selected high frequency components substantially attenuated.

12. A system according to claim 11 wherein said amplitude scaling network further comprises an integrator network, coupled between said second low-pass filter and said third multiplier input terminal, wherein said integrator network includes means for integrating said amplitude error signal from said second low-pass filter to generate a substantially dc scale factor signal at said third multiplier input terminal.

13. A system according to claim 12 wherein said amplitude scaling network further comprises, a second compensation network, coupled between said first multiplier output terminal and said third multiplier input terminal, and including means for critically damping said amplitude scaling network.

14. A system according to claim 13 wherein said amplitude scaling network further comprises, a second band-pass filter network, coupled between said second multiplier output terminal and said second multiplier input terminal, and including means for selecting a range of frequencies associated with said noise component for which said amplitude scaling network is operable.

15. A signal processing system responsive to an input signal including an information portion and a periodic noise component for generating an output signal substantially representative of said information portion, wherein said noise component has an associated phase angle, frequency and amplitude, said system comprising:
  A. a phase and frequency nulling network responsive to said output signal including means for detecting said frequency and said phase angle associated with said periodic noise component, and means for generating a nulling signal having a frequency and a phase angle substantially equal to said frequency and said phase angle associated with said noise component; and
  B. a combining subsystem, including a combining output terminal and a first combining input terminal coupled to said nulling signal and a second combining input terminal coupled to said input signal, and including means for generating said output signal at said combining output terminal, wherein at an initial time said output signal is representative of said information portion plus said noise component, and at a subsequent time said output signal is representative of a combination of said nulling signal and said information portion plus said noise component wherein said nulling signal and said noise component sum to substantially zero.

16. A system according to claim 15 wherein said combining subsystem further comprises a summation network having a first summation input terminal, a second summation input terminal, and a summation output terminal, said first summation input terminal being adapted for connection to said input signal, said second input terminal being coupled to said nulling signal, and said summation network including means for generating said output signal at said summation output terminal, wherein said output signal is representative of an addition of said input signal and said nulling signal.

17. A system according to claim 16 wherein said system further comprises amplitude scaling means for scaling said nulling signal to have an amplitude substantially equal to said amplitude of said noise component.

18. A system according to claim 15 wherein said combining subsystem further comprises a gyroscope assembly, said gyroscope assembly including:
  A. a housing assembly;
  B. a rotor, movably mounted in said housing assembly to enable said rotor to spin freely about a rotational axis and also to enable said rotor to remain substantially fixed in inertial space, independent of movement of said housing assembly;
  C. a rotational position detector assembly, coupled to said rotor, and including means for producing said output signal at said combining output terminal, wherein at said initial time said input signal is representative of a first angular position of said rotor measured between said rotational axis and a first cartesian axis, and includes said noise component; and D. a first actuator assembly, coupled to said rotor and to said combining output terminal, and including means for attenuating said noise component by applying a torque to said rotor to alter said first angular position of said rotor, wherein said torque is representative of said nulling signal.

19. A system according to claim 18 wherein said system further comprises amplitude scaling means for scaling said nulling signal to have an amplitude substantially equal to said amplitude of said noise component.

20. A signal processing system for generating at least first and second noise nulling signals for controlling at least first and second torque actuators to attenuate a periodic vibrational noise in a mechanical apparatus, said vibrational noise being resolvable into a first noise component acting predominantly along a first cartesian axis and a second noise component acting predominantly along a second cartesian axis, said first torque actuator being capable of applying a first mechanical torque to said apparatus along said first cartesian axis, and said second torque actuator being capable of applying a second mechanical torque to said apparatus along said second cartesian axis, and wherein said torque actuators are related to each other by a first cross-coupling coefficient which defines a portion of said first mechanical torque cross-coupled to said apparatus along said second cartesian axis and by a second cross-coupling coefficient which defines a portion of said second mechanical torque cross-coupled to said apparatus along said first cartesian axis, said system comprising:

A. a first phase and frequency nulling network including,
  i. means for generating a first in-phase signal having a frequency and a phase angle substantially equal to a frequency and a phase angle associated with said first noise component, and
  ii. means for generating a first out-of-phase signal having a frequency substantially equal to said frequency associated with said first noise component and a phase angle differing by a first amount from said phase angle associated with said first noise component;

B. a second phase and frequency nulling network including,
  i. means for generating a second in-phase signal having a frequency and a phase angle substantially equal to a frequency and a phase angle associated with said second noise component, and
  ii. means for generating a second out-of-phase signal having a frequency substantially equal to said frequency associated with said second noise component and a phase angle differing by a second amount from said phase angle associated with said second noise component;

C. a coupling network including,
  i. first scaling means for generating a first scaled in-phase signal, wherein said first scaled in-phase signal is representative of a multiplication of said first in-phase signal by said first cross-coupling coefficient,
  ii. second scaling means for generating a second scaled in-phase signal, wherein said second scaled in-phase signal is representative of a multiplication of said second in-phase signal by said second cross-coupling coefficient,
  iii. first summation means for generating said first nulling signal, wherein said first nulling signal is representative of an addition of said first scaled in-phase signal and said second out-of-phase signal, and
  iv. second summation means for generating said second nulling signal, wherein said second nulling signal is representative of an addition of said second scaled in-phase signal and said first out-of-phase signal.

21. A system according to claim 20 wherein said system further comprises:
A. a first amplitude scaling network including,
  i. means for scaling said first in-phase signal to have an amplitude substantially equal to an amplitude associated with said first noise component, and
  ii. means for scaling said first out-of-phase signal to have an amplitude substantially equal to an amplitude associated with said first noise component; and
B. a second amplitude scaling network including,
  i. means for scaling said second in-phase signal to have an amplitude substantially equal to an amplitude associated with said second noise component, and
  ii. means for scaling said second out-of-phase signal to have an amplitude substantially equal to an amplitude associated with said second noise component.

22. A system according to claim 20 wherein said first amount is ninety degrees.

23. A system according to claim 20 wherein said second amount is ninety degrees.

24. A method for attenuating a periodic noise component of an input signal said input signal including an information portion and said noise component, wherein said noise component has an associated phase angle, frequency and amplitude, said method comprising the steps of:
A. measuring an output signal to detect said frequency and said phase angle associated with said periodic noise component;
B. generating a nulling signal having a frequency and a phase angle substantially equal to said frequency and said phase angle associated with said noise component; and
C. combining said nulling signal and said input signal to generate said output signal wherein said nulling signal substantially attenuates said noise component and said output signal is substantially representative of said information portion.

25. A method according to claim 24 wherein said method further includes the steps of:
A. detecting said amplitude associated with said periodic noise component; and
B. scaling said nulling signal to have an amplitude substantially equal to said amplitude associated with said noise component.

26. A system according to claim 3 wherein said system further comprises amplitude scaling means for scaling said nulling signal to have an amplitude substantially equal to said amplitude of said noise component.

* * * * *